United States Patent [19]

Kawazome

[11] Patent Number: 5,274,752
[45] Date of Patent: Dec. 28, 1993

[54] OUTLINE DATA IMAGE DRAWING APPARATUS APPLYING IMAGE DRAWING DIRECTION RULES AND IMAGE DRAWING RULES

[75] Inventor: Ichiro Kawazome, Saitama, Japan

[73] Assignee: Fuji Xerox Co., Ltd., Tokyo, Japan

[21] Appl. No.: 596,397

[22] Filed: Oct. 12, 1990

[30] Foreign Application Priority Data

Feb. 9, 1990 [JP] Japan .................................. 2-29982

[51] Int. Cl.$^5$ .............................................. G06F 15/62
[52] U.S. Cl. .................................. 395/133; 395/141; 395/120
[58] Field of Search ............................... 395/133–139, 395/119–120, 141–143

[56] References Cited

U.S. PATENT DOCUMENTS 4,688,181 8/1987 Cottrell et al. ................ 395/133 X

OTHER PUBLICATIONS

Foley and VanDam, Fundamentals of Interactive Computer Graphics (1984) pp. 455–456.

Primary Examiner—Gary V. Harkcom
Assistant Examiner—Almis Jankus
Attorney, Agent, or Firm—Finnegan, Henderson, Farabow, Garrett & Dunner

[57] ABSTRACT

A scan conversion device generates segment direction information on the basis of vector information representing outlines of a pattern such as graphic FIGURES. An image drawing data generating device generates raster information inclusive of image drawing direction information in accordance with predetermined image drawing direction rules on the basis of the segment direction information, and further generates new image drawing data to be stored into a frame memory in accordance with predetermined image drawing rules on the basis of the raster information and previous image drawing data read from the corresponding memory area of the frame memory. The frame memory stores the image drawing data on a dot-by-dot basis. A dot pattern converting device converts the image drawing data provided from the frame memory into a dot pattern signal in accordance with an image drawing mode as set.

1 Claim, 8 Drawing Sheets

ORIGINAL FIGURES

FIG. 2(b)

BIT-MAP-DEVELOPED FIGURES

IMAGE DRAWING DIRECTION RULES 40A

| INFORMATION ON IMAGE DRAWING DIRECTION | COMBINATIONS OF PROCEEDING DIRECTIONS OF THE IMMEDIATELY PRECEDING SEGMENT AND THE CURRENT SEGMENT |
|---|---|
| Up: THE DIRECTION IN WHICH THE IMMEDIATELY PRECEDING SEGMENT HAS PROCEEDED IS NOT DOWNWARD AND THE DIRECTION IN WHICH THE CURRENT SEGMENT IS TO PROCEED IS UPWARD. | |
| Down: THE DIRECTION IN WHICH THE IMMEDIATELY PRECEDING SEGMENT HAS PROCEEDED IS DOWNWARD AND THE DIRECTION IN WHICH THE CURRENT SEGMENT IS TO PROCEED IS NOT UPWARD. | |
| *: ANY CASE OTHER THAN EITHER OF THE ABOVE TWO CASES. | |

FIG. 4(b)

IMAGE DRAWING RULES 40B

TRANSITION OF DATA STATE IN FRAME MEMORY

Up ⟶    * ⟶
Down ┄┄▶    RESET ┄┄▶

FIG. 10(a) DATA IN FRAME MEMORY
FIG. 10(b) COUNT VALUE
FIG. 10(c) PATTERN FILLING FLAG
FIG. 10(d) NEGATIVE OUTLINE FLAG
FIG. 10(e) POSITIVE OUTLINE FLAG
FIG. 10(f) * OUTLINE FLAG
FIG. 10(g) 0 FLAG

FIG. 11

GRAPHIC FIGURE SUBJECTED TO PATTERN FILLING OPERATION

FIG. 12

GRAPHIC FIGURE SUBJECTED TO OUTLINE PROCESSING

FIG. 13

GRAPHIC FIGURE SUBJECTED TO INVERTING PROCESSING

OUTLINE DATA IMAGE DRAWING APPARATUS APPLYING IMAGE DRAWING DIRECTION RULES AND IMAGE DRAWING RULES

BACKGROUND OF THE INVENTION

The present invention relates to an outline data image drawing apparatus which generates a desired dot pattern for, e.g., filling up a pattern such as a graphic FIGURE on the basis of raster information.

In conventional outline data image drawing apparatuses, only the changing points, at which an outline is undergoing a change of its coordinate in the predetermined one axis direction (i.e., X or Y direction), are stored in an image memory when the apparatus draws an outline (contour) of a graphic FIGURE or the like. When the apparatus performs a pattern-filling operation, data is inverted each time the scanning in the image memory along the other axis encounters a changing point.

Figure 14A:
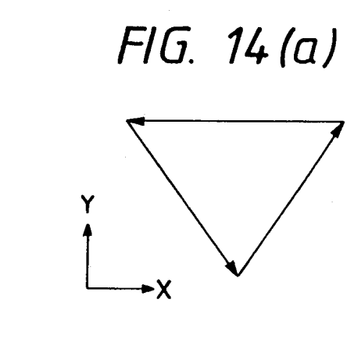
Figure 14B:
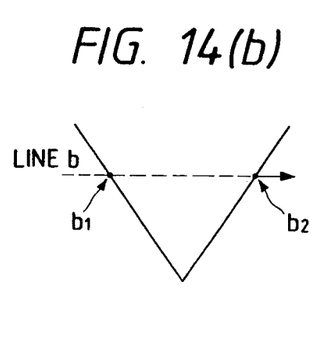
Figure 14C:
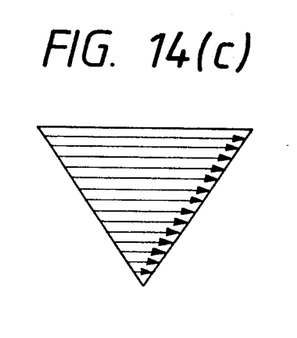

For example, when an outline data image drawing apparatus of the above type draws an outline of a triangular form as shown in FIG. 14(a) into its image memory, only the changing points in relation to, for example, the Y axis are stored in the image memory as shown in FIG. 14(b). In performing an operation of filling up a pattern with dots, the scanning is performed along the X direction in the image memory in which an image has been drawn, as illustrated in FIG. 14(b). When the scanning along for example, the line "b" reaches the changing point b1, data "1" (or "0") is set to start the filling. Then, when the scanning reaches the next changing point b2, data is inverted to "0" (or "1") to finish the filling. Thus, the triangular FIGURE shown in FIG. 14(a) is filled up with dots as shown in FIG. 14(c) by performing the pattern filling operation with respect to individual lines along the X direction in the image memory. In FIG. 14, each point is filled with a dot when the data is at "1".

Figure 15A:
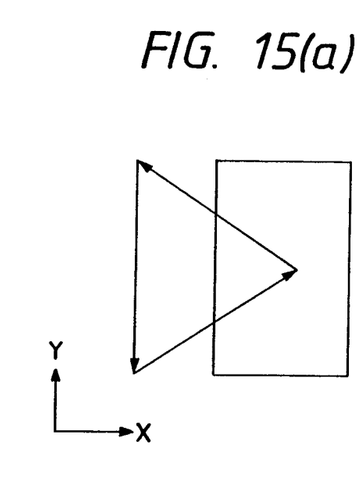
Figure 15B:
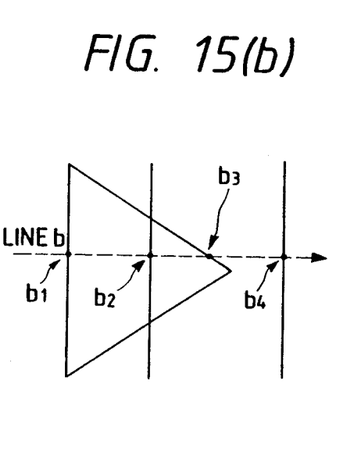
Figure 15C:
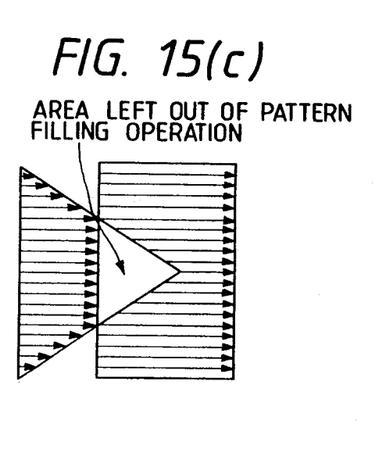

However, the conventional outline data image drawing apparatus mentioned above draws outlines in such a memory as illustrated in FIG. 15(b) into the image memory, since it stores only the changing points of the image drawing direction in relation to, for example, the Y axis. (The original outlines are overlapped with each other as shown in FIG. 15(a).) When a pattern filling operation is performed by scanning such an image, which has been drawn in the image memory, the apparatus starts pattern filling by shifting the data from "0" to "1" when the scanning reaches the first changing point b1 on the line b, stops pattern filling by inverting the data from "1" to "0" when the scanning reaches the changing point b2, further resumes pattern filling by inverting the data from "0" to "1" when the scanning reaches the changing point b3, and then finishes pattern filling when the scanning reaches the final changing point b4. The apparatus thereafter proceeds to the execution of the pattern filling operation of the next line. Therefore, the conventional outline data image drawing apparatus has a shortcoming that it is incapable of achieving an accurate pattern filling operation in relation to the original graphic FIGURES, since the area where outlines overlap with each other escapes from the pattern filling operation as shown in FIG. 15(c).

Also, since only the changing points in relation to the X or Y direction of outlines are stored in the image memory, it is not possible to extract only the outlines.

SUMMARY OF THE INVENTION

The present invention has been made with an object of offering an outline data image drawing apparatus which is capable of achieving accurate filling of a pattern even where outlines are overlapped with each other, and also capable of extracting the outlines, thus overcoming the above-mentioned shortcomings of the conventional apparatuses.

According to the present invention, an outline data image drawing apparatus having converting means for converting vector information representing outlines of a pattern such as graphic FIGURES into raster information, comprises memory means which stores image drawing data on a dot basis, and image drawing data generating means which generates image drawing data in accordance with previously established image drawing rules on the basis of stored image drawing data read out of the memory means and the raster information including image drawing direction information which relates to an image drawing direction of an outline vector corresponding to the vector information, and draws the generated image drawing data into the memory means.

In the outline data image drawing apparatus according to the present invention, the raster information inclusive of the information on the image drawing direction is generated, in accordance with the image drawing direction rules established in advance with respect to the image drawing direction, on the basis of information on the direction in which a current line segment is to proceed and information on the direction in which the immediately preceding line segment has proceeded.

For example, the raster information is generated as follows:

(1) In the case of the upward direction (positive direction), the value "+1" is generated as the raster information inclusive of the image drawing direction information indicating the positive direction.

(2) In the case of the downward direction (negative direction), the value "−1" is generated as the raster information inclusive of the image drawing direction information indicating the negative direction.

(3) In any case other than cases (1) and (2), the value "*"=(1000) in four bit representation is generated as the raster information determined in advance.

In the memory means, the value obtained by adding the raster information obtained in accordance with the particular case out of cases (1) through (3) and the data read out of the memory area where the image drawing data is to be drawn is drawn into the same area as the image drawing data. As an exception to the above items, the preset value "*"=(1000) is drawn in case the added value is "0".

Accordingly, when a pattern filling operation is to be performed, the present invention makes it possible to perform an accurate pattern filling operation in correspondence with a desired pattern by outputting a dot pattern on the basis of the stored contents in the memory means, since the image drawing data corresponding to outlines of a desired pattern are drawn into the memory means even when the outlines of graphic FIGURES or the like are overlapped with each other.

BRIEF DESCRIPTION OF THE DRAWINGS

FIG. 10(a) to 10(g) represent an illustrative chart for a description of dot pattern converting operation performed by a dot pattern converting device;

FIGS. 14(a) to 14(c) and 15(a) to 15(c) illustrate pattern filling operation in a conventional outline data image drawing apparatus.

DETAILED DESCRIPTION OF THE PREFERRED EMBODIMENT

In the following, a preferred embodiment of an outline data image drawing apparatus according to the present invention is described with reference to the accompanying drawings.

Figure 1:
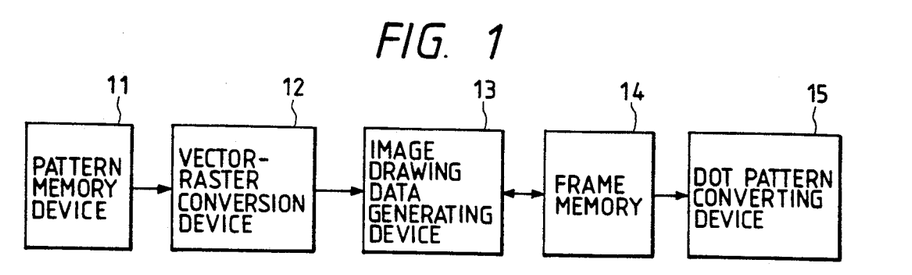
FIG. 1 is a block diagram illustrating an embodiment of an outline data image drawing apparatus according to the present invention.

FIG. 1 is a block diagram illustrating a preferred embodiment of an outline data image drawing apparatus according to the present invention. In the FIGURE, the outline data image drawing apparatus comprises a pattern memory device 11 which stores vector information of an outline font, a scan conversion device 12 which converts the outline vector information of a prescribed pattern into raster information, an image drawing data generating device 13 which generates image drawing data and draws an image thereof into a frame memory 14 in accordance with the image drawing direction rules and the image drawing rules described later, the frame memory 14 which stores the image drawing data on a dot-by-dot basis, and a dot pattern converting device 15 which processes the data stored in the frame memory 14 in accordance with the image drawing mode as set and converts the processed data into a dot pattern signal.

Figure 2A:
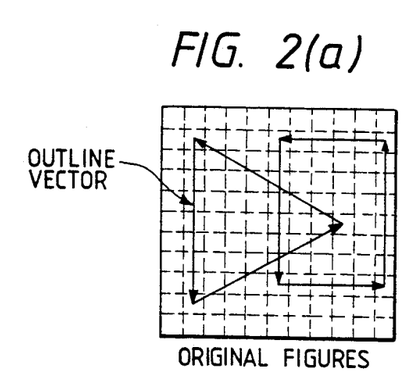
FIGS. 2(a) and 2(b) include illustrative charts for a description of bit map development.
Figure 2B:
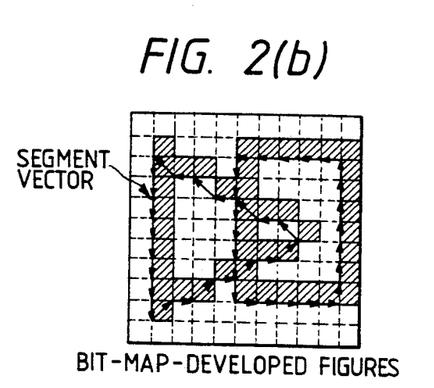

Outline vectors (original graphic FIGURES) as shown in FIG. 2(a), which are based on the vector information stored in the pattern memory device 11, are converted into raster information by the scan conversion device 12, and are further developed into a bit map in the frame memory 14 by the image drawing data generating device 13 on the basis of vectors of individual segments, as shown in FIG. 2(b). In this regard, the segment vectors shown in FIG. 2(b) are to serve the purpose of illustration, and information on these segment vectors is not stored actually.

Figure 3:
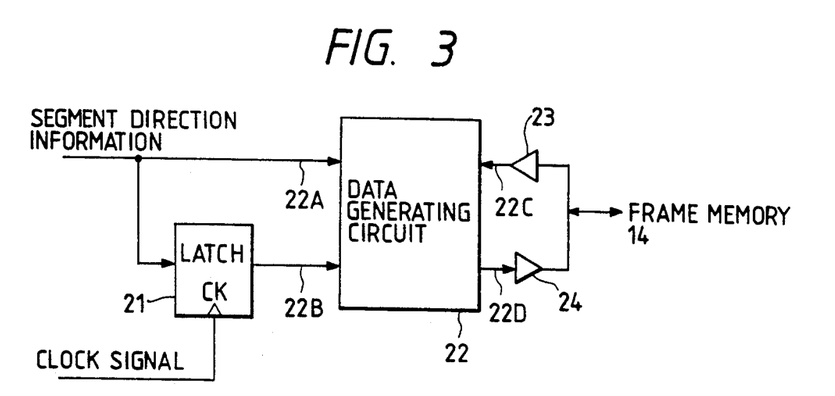
FIG. 3 is a schematic diagram illustrating the construction of an image drawing data generating device.

As shown in FIG. 3, the image drawing data generating device 13 comprises a data generating circuit 22 which receives segment direction information 22A output from the scan conversion device 12 and indicating the image drawing direction of the segment (namely, the information on the direction in which the segment is going to proceed) and another segment direction information 22B (that is, the information indicating the direction in which the segment has proceeded) output from a latch circuit 21 which latches the segment direction information 22A. Based on these two kinds of information, the data generating circuit 22 generates raster information including the image drawing direction information in accordance with the image drawing direction rules 40A presented in FIG. 4(a), generates the image drawing data 22D, in accordance with the image drawing rules 40B shown in FIG. 4(b), on the basis of the raster information thus generated and stored information 22C read out of the one-dot area in the frame memory 14 to which an image drawing data is to be drawn this time and provided through a buffer 23, and then outputs the image drawing data 22D generated in this manner. The image drawing data 22D thus generated is drawn into the frame memory 14 via a buffer 24.

Figure 4A:
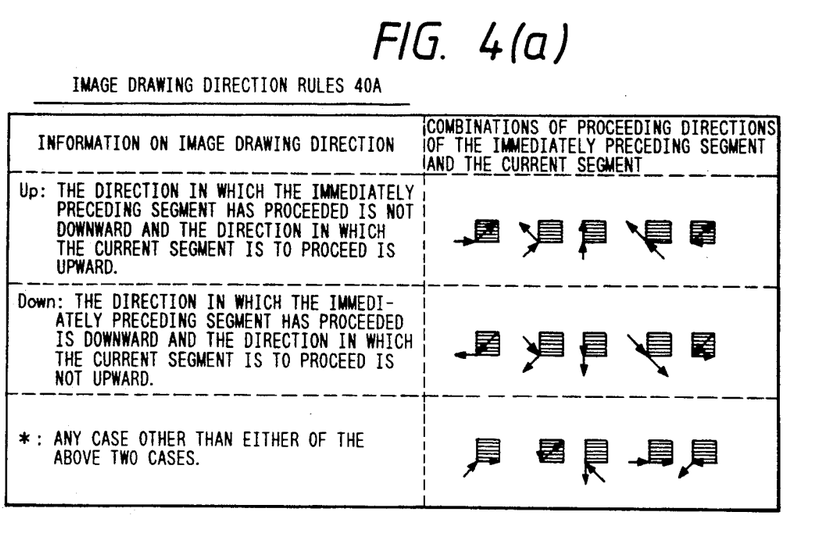
FIG. 4(a) and 4(b) include illustrative charts for a description of the image drawing direction rules and image drawing rules.

The image drawing direction rules 40A are used to determine, as shown in FIG. 4(a), the image drawing direction information to be drawn into a one-dot memory area in the frame memory 14, and to generate the raster information which includes the image drawing direction information. The image drawing rules 40B are used to generate the image drawing data for the memory area on the basis of the raster information generated in accordance with the image drawing direction rules 40A and the stored data read out of the same memory area in the frame memory 14.

The image drawing direction rules 40A are described in the following:

(1) In case the direction in which the immediately preceding line segment has proceeded is not downward and the direction in which the current segment is to proceed is upward, it is regarded that the image drawing direction is upward (UP), and the raster information inclusive of such directional information is set at the value "+1" ("0001" as expressed in four bits).

(2) In case the direction in which the immediately preceding line segment has proceeded is downward and the direction in which the current segment is to proceed is not upward, it is regarded that the image drawing direction is downward (DOWN), and the raster information inclusive of such directional information is set at the value "−1" ("1111" as expressed in four bits).

(3) In any case other than cases (1) and (2), it is regarded that the image drawing direction is as set in advance (which is indicated by "*" hereinafter), and the raster information inclusive of such directional information is set at the predetermined value "*". The value "*" is expressed by the value "0" ("1000" as expressed in four bits) under rule (3).

It is noted that the direction in which the segment has proceeded corresponds to the segment direction information 22B, and the direction in which the segment is to proceed corresponds to the segment direction information 22A.

Now, the image drawing rules 40B are described below. The values given in brackets ( ) are those indicated in four bits.

1. Memory information of a memory area where no image drawing has been done should be set at the value "0", i.e., (0000).
2. In case a value of memory information is "0" and raster information has been produced in accordance with rule (1) as "+1", image drawing data should be set at the value "+1", (0001).
3. In case a value of memory information is "0" and raster information has been produced in accordance with rule (2) as "1", image drawing data should be set at the value "−1", (1111).
4. In case a value of memory information is "0" and raster information has been produced in accordance with rule (3) as "*", image drawing data should be set at the value "*", (1000).
5. In case a value of memory information is either a positive or negative value and raster information has been produced in accordance with either rule (1) or rule (2), image drawing data should, as a general rule, be set at the value obtained by addition of the value "+1" or "−1" to the value stored in the particular area (namely, the image drawing data already stored therein).
6. As an exception to rule 5, image drawing data should be set at the value "*", (1000), in case a value of memory information is "+1" and raster information has been produced in accordance with rule (2) as "−1", or in case a value of memory information is "−1" and raster information has been produced in accordance with rule (1) as "+1".
7. As an exception to the rule 5, image drawing data should be set at the value "+1", (0001) or at the value "−1", (1111), in case a value of memory information is "*" and raster information has been produced in accordance with rule (1) or rule (2).
8. As an exception to rule 5, image drawing data should be kept at a value of memory information (a positive or negative value) without making any change, in case the value of the memory information is either a positive or negative value and raster information has been produced in accordance with rule (3).

With respect to rule 2, it is noted that in case image data stored in a memory area for one dot in the frame memory 14 is at the value "+1", only one outline in the image drawing direction "UP" as produced in accordance with rule 2 may be present in this particular area, or there may be overlaid a total of five outlines consisting of three outlines of the UP direction and two outlines of the DOWN direction produced in accordance with rule 2 and rule 5, respectively.

Figure 4B:
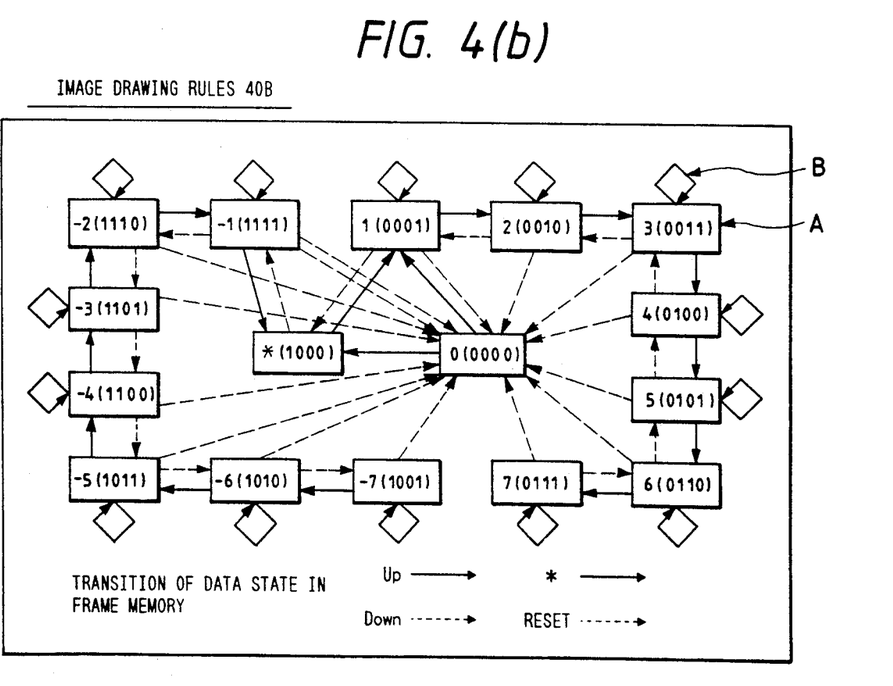

The blocks enclosed by a solid line as indicated by arrow mark A in FIG. 4(b) indicate image drawing data. As shown by arrow mark B in the same FIGURE, there is shown next to each solid line frame a bent arrow (bent vector) where the starting point and the ending point are adjacent to each other. This indicates that data starts from a block and returns to the same block, namely, a case that comes under rule 8.

Figure 5:
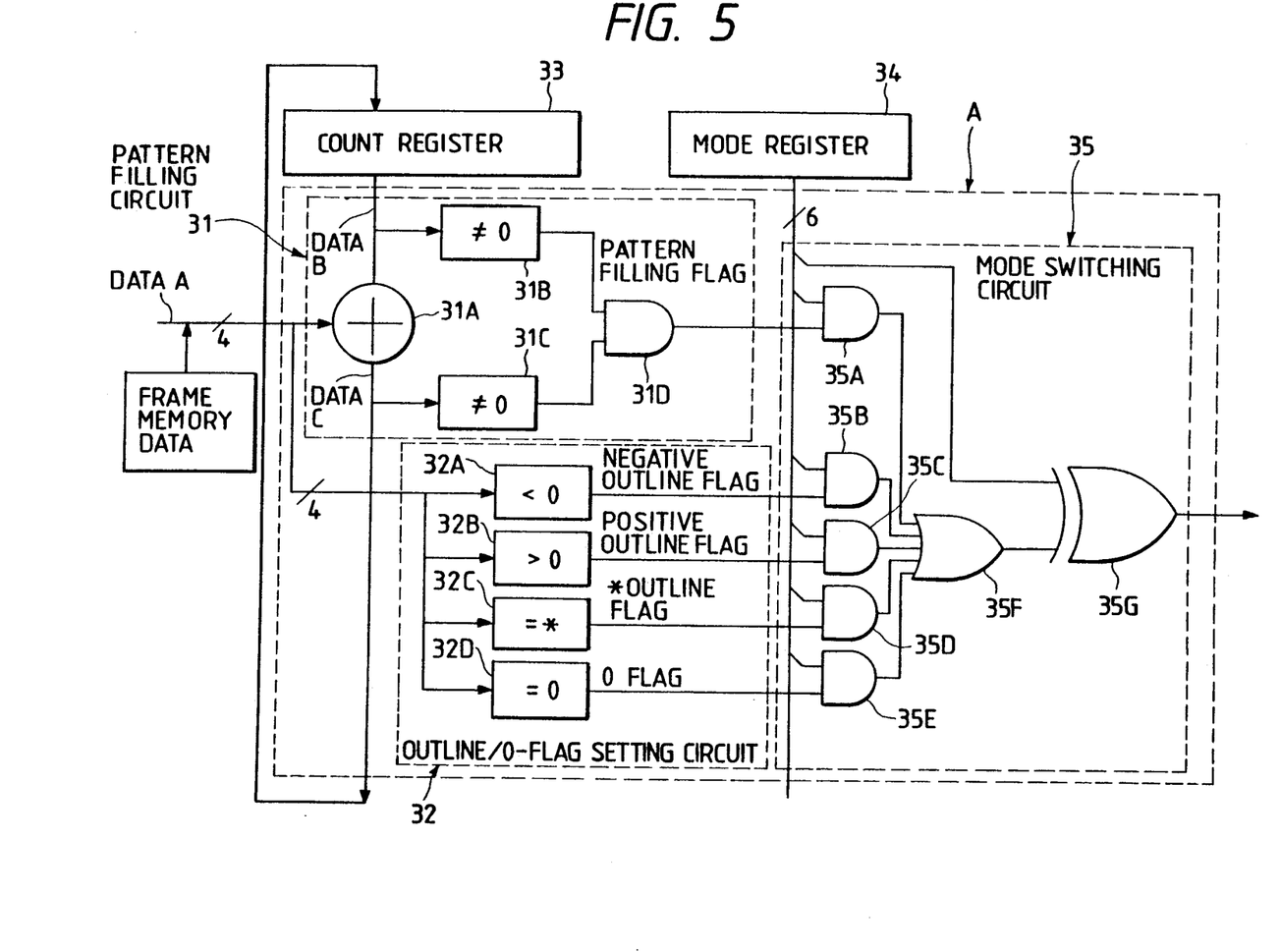
FIG. 5 is a schematic diagram illustrating the construction of a dot pattern converting device.

The dot pattern converting device 15, as shown in FIG. 5, is comprised of a pattern filling circuit 31 which outputs a signal for execution of the pattern filling operation, an outline/0-flag setting circuit 32 which sets flags of outlines and "0", a count register 33, a mode register 34 which stores information for setting of image drawing modes of pattern filling, outlining, inversion, and so forth, and a mode switching circuit 35 which changes the mode in accordance with the image drawing mode as set.

The data (in four bits) output from the frame memory 14 is input to the pattern filling circuit 31 and to the outline/0-flag setting circuit 32.

In the pattern filling circuit 31, the data output from the frame memory 14 (data A) and the data output from the count register 33 (data B) are added by an adder 31A. The data thus obtained (data C) are provided to the count register 33. At the same time, it is decided by a deciding part 31B whether or not the relationship, data B≠0, holds for the data B, and it is decided by a deciding part 31C whether or not the relationship, data C≠0, holds for the data C. The deciding parts 31B and 31C set up the pattern filling flags when they have respectively decided that the relationship, data B≠0, and the relationship, data C≠0, hold, and provides the flags to the input terminals of AND circuit 31D. The AND circuit 31D provides a signal, which corresponds to the two data values input to its input terminals, to the mode switching circuit 35.

In the meanwhile, the outline/0-flag setting circuit 32 has deciding parts 32A through 32D which are set respectively with different criteria for making decisions. When the data A is input to each of these deciding parts 32A through 32D, each deciding part decides whether or not the data A thus input is in conformity with its decision criterion. That is, the deciding part 32A decides whether or not the relationship, data A<0, holds, and if the data A is in conformity with such a decision criterion, the deciding part 32A sets and outputs a "negative" outline flag. The deciding part 32B decides whether or not the relationship, "data A>0", holds, and, if the data A is in conformity with such a decision criterion, the deciding part 32B sets and outputs a "positive" outline flag. The deciding part 32C decides whether or not the relationship, "data A=*", holds, and, if the data A is in conformity with such a decision criterion, the deciding part 32C sets and outputs a "*" outline flag. The deciding part 32D decides whether or not the relationship, "data A =0", holds, and, if the data A is in conformity with such a decision criterion, the deciding part 32D sets and outputs a "0" flag. The output data thus output from the individual deciding parts are input to the mode switching circuit 35.

The mode switching circuit 35, as shown in FIG. 5, is comprised of an AND circuit 35A in which one input terminal receives the data output from the AND circuit 31D and the other receives the data output from the mode register 34, AND circuits 35B through 35E in each of which one input terminal receives the data output from a relevant deciding part in the outline/0-flag setting circuit 32 and the other receives the data output from the mode register 34, an OR circuit 35F which receives the results of logical multiplication as output from the AND circuit 35A through 35E and outputs a result which is obtained by logical sum of the input data, and an exclusive OR circuit (hereinafter called "Ex-OR circuit") 35G which performs exclusive logical sum operation receiving the data output from the OR circuit 35F and the data output from the mode register 34.

The data output from the mode register 34 is set in correspondence with either of modes I through III described in the following:

I. When the pattern filling mode is set, the data is set in such a manner that the signal "1" is input only to the input terminals of the AND circuits 35A and 35B.

II. When the outline processing mode is set, the data is set in such a manner that the signal "1" is input only to the input terminals of the AND circuits 35B, 35C and 35D.

III. When the inverting process mode is set, the data is set in such a manner that the signal "1" is input only to the input terminals of the AND circuits 35A and 35B, and the exclusive-OR circuit 35G.

In this embodiment, the system is constructed in such a manner that the pattern filling operation is performed when the signal "1" is output from the Ex-OR circuit 35G and it is not performed when the signal "0" is output.

The area enclosed with the dashed line indicated by arrow mark A in FIG. 5 represents the circuit construction for the output of a dot pattern of a single bit. If it is intended to operate the circuit for its output of a dot pattern of n bits, it serves the purpose to use n units of the circuit construction of the area enclosed with the dashed line.

Figure 6:
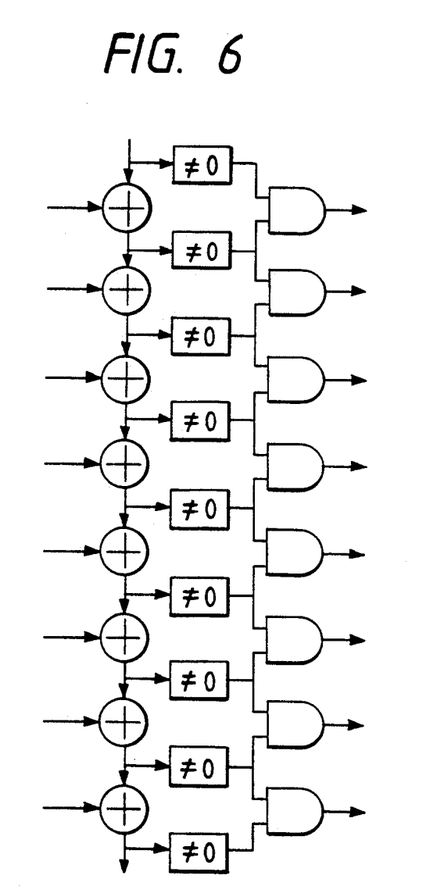
FIGS. 6 and 7 are diagrams illustrating the construction of a pattern filling circuit to be used in the case where addition for eight bits by a counter is performed at a time.
Figure 7:
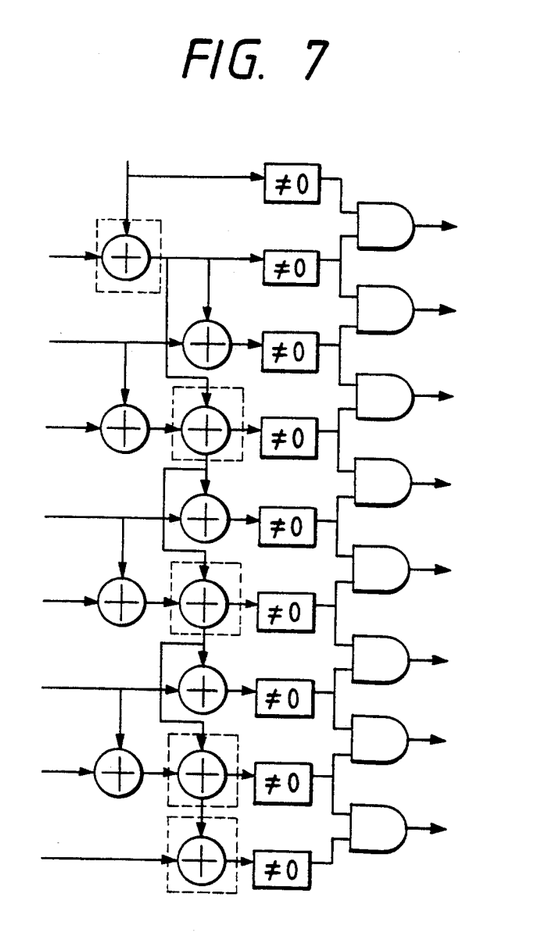

For example, when addition in the counter is performed at a time for eight bits for the output of a dot pattern of eight bits, the circuit may be constructed so that a delay time occurs in eight stages of adders as shown in Fig. 6, or in five stages of adders (enclosed with dashed lines in FIG. 7). The circuit construction shown in FIG. 7 operates with a shorter total delay time than in the case of the circuit construction shown in FIG. 6, and is therefore faster in performing the adding operation in the counter.

Next, a description is made of the processing operation performed by the outline data image drawing apparatus described above.

First, a description is made of the operation for drawing the image drawing data from the image drawing data generating device 13 into the frame memory 14.

Figure 8:
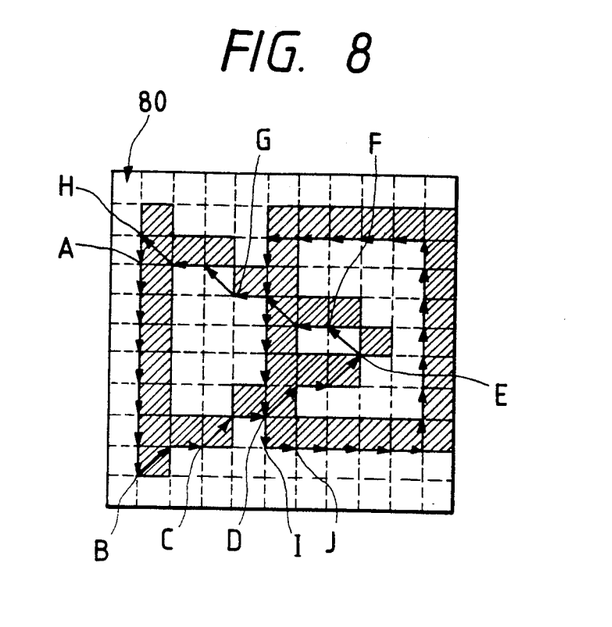
FIG. 8 is an illustrative chart for a description of image data drawing into a frame memory.
Figure 9:
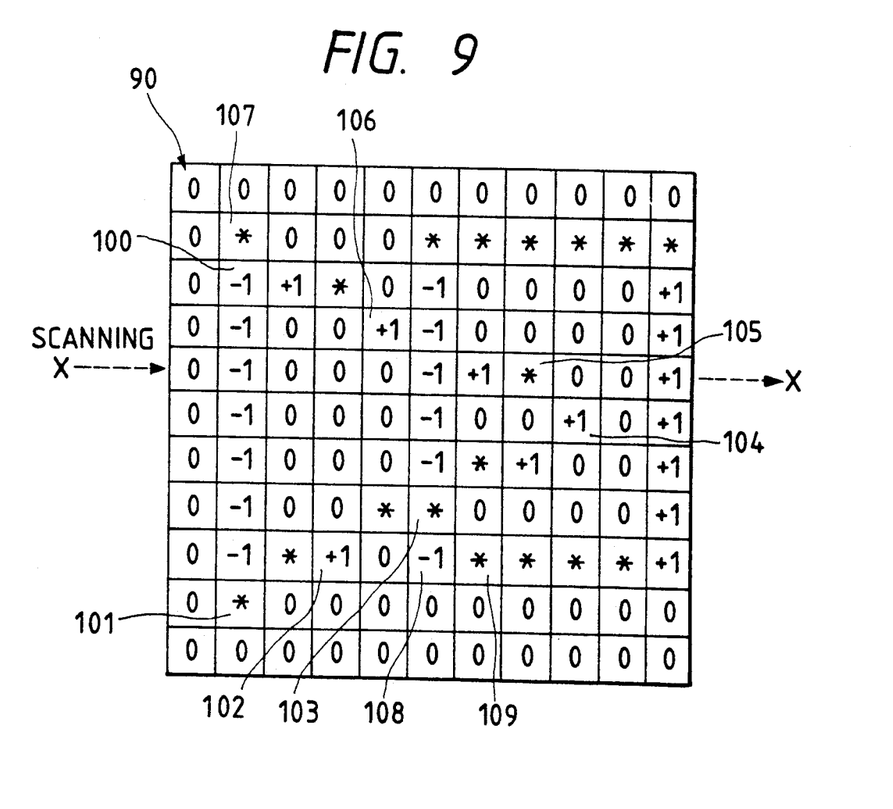
FIG. 9 is a status chart showing memory contents stored in the frame memory.

When the raster information shown in FIG. 8 is input to the image drawing data generating device 13 from the scan conversion device 12, the image drawing data generating device 13 draws the image drawing data into the frame memory 14 on the basis of the input raster information in accordance with the image drawing direction rules 40A shown in FIG. 4(a) and the image drawing rules 40B shown in FIG. 4(b). FIG. 9 shows the state of image drawing of the image drawing data in the frame memory 14.

A single matrix element as indicated, for example, by reference number 80 in FIG. 8 or reference number 90 in FIG. 9 corresponds to image drawing data of one dot. Individual elements in FIG. 8 and those in FIG. 9 are in mutual correspondence. Points A through J in FIG. 8 indicate the lower left corners of the respective elements. The elements indicated by points A through J are, therefore, in correspondence with the memory areas 100 through 109 shown in FIG. 9, respectively.

The image drawing process for drawing image drawing data into the memory areas 100 to 109 will now be described with reference to FIGS. 8 and 9.

It is assumed for convenience in this description that a triangle is drawn first and then a rectangle is drawn.

[Drawing into memory area 100]

At point A, since rule (2) is satisfied, the value "−1" is drawn into this particular memory area.

[Drawing into memory area 101]

At point B, since rule (3) is satisfied the value "*" is drawn into this particular memory area in accordance with rule 4.

[Drawing into memory area 102]

At point C, since rule (1) is satisfied, the value "+1" is drawn into this particular memory area in accordance with rule 2.

[Drawing into memory area 103]

Into this memory area, both of an outline of the triangle and an outline of the rectangle are drawn. In drawing the triangle, since rule (1) is satisfied at point D shown in FIG. 8, the value "+1" is drawn as image drawing data into this particular memory area in accordance with rule 2. However, when the rectangle is drawn at the next step, since rule (2) is met at point D shown in FIG. 8, the value "*" is drawn as image drawing data into this particular memory area in accordance with rule 6.

In this case, in drawing the triangle, the image drawing data (namely, "+1") is generated in the data generating circuit 22 in accordance with the image drawing rules 40B on the basis of the value "0" (stored information 22C) input via the buffer 23 and the value "+1" generated in accordance with the image drawing direction rules 40A. Then, when the rectangle is drawn, the image drawing data (namely, "*") is generated in accordance with rule 6 of the image drawing rules 40B on the basis of the value "+1" (stored information 22C) input via the buffer 23 and the value "−1" generated in accordance with the image drawing rules 40A.

[Drawing into memory area 104]

At point E, since rule (1) is satisfied, the value "+1" is drawn into this particular memory area in accordance with rule 2.

[Drawing into memory area 105]

At point F, since rule (3) is satisfied, the value "*" is drawn into this particular memory area in accordance with rule 7.

[Drawing into memory area 106]

At point G, since the rule (1) is satisfied, the value "+1" is drawn into this particular memory area in accordance with rule 2.

[Drawing into memory area 107]

At point H, since rule (3) is satisfied, the value "*" is drawn into this particular memory area in accordance with rule 7.

[Drawing into memory area 108]

At point I, since rule (2) is satisfied, the value "−1" is drawn into this particular memory area.

[Drawing into memory area 109]

At point J, since rule (3) is satisfied, the value "*" is drawn into this particular memory area in accordance with rule 7.

Next, a description is made of the dot pattern converting operation by the dot pattern converting device 15 along the line X—X in the frame memory 14, where the image drawing data are drawn as illustrated in FIG. 9.

In FIG. 10, part (a) indicates data (i.e., image drawing data) along the line X—X in the frame memory 14 shown in FIG. 9, which are input to the adder 31A, part (b) indicates count values of the count register 33, part (c) indicates flags output from the AND circuit 31D, part (d) indicates flags output from the deciding part 32A, part (e) indicates flags output from the deciding part 32B, part (f) indicates the flags output from the deciding part 32C, and part (g) indicates flags output from the deciding part 32D. The individual memory areas (individual elements) shown in FIG. 10(a) and the individual elements shown in FIGS. 10(c) through 10(g) are in their respective correspondence, and the slanted lines in the elements in FIGS. 10(c) through 10(g) indicate the flags of such elements are "1".

Figure 10A:
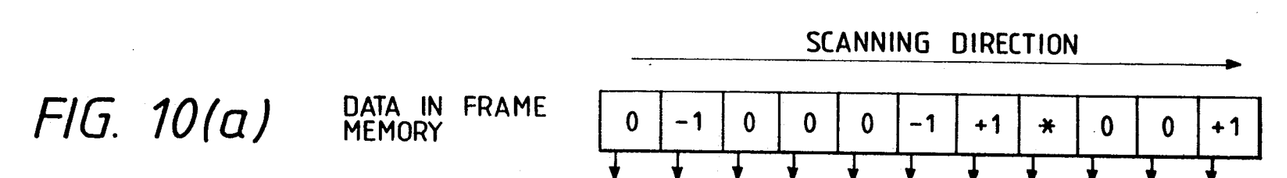

Now, when the image drawing data as shown in FIG. 10(a) are input in regular sequence to the dot pattern converting device 15, these image drawing data are input to the pattern filling circuit 31 and the outline/0-flag setting circuit 32.

Figure 10B:
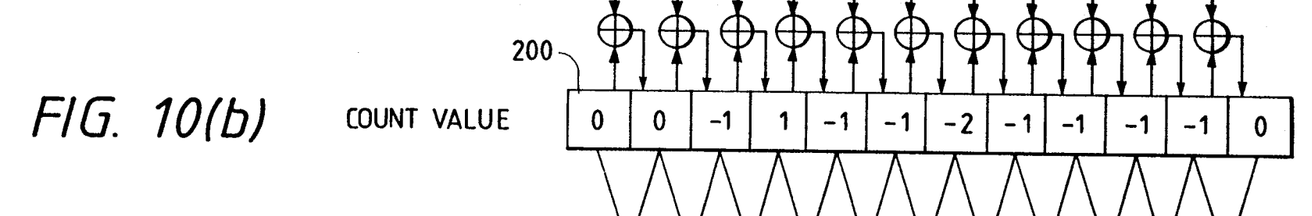
Figure 10C:
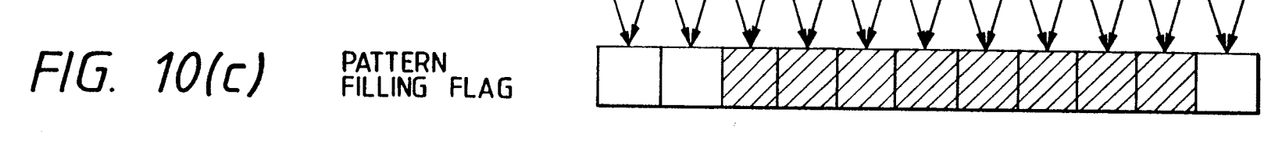
Figure 10D:
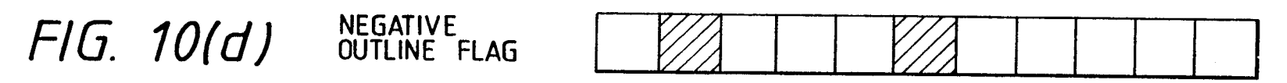
Figure 10E:
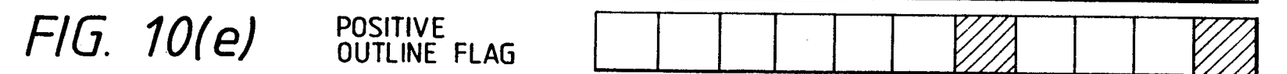
Figure 10F:
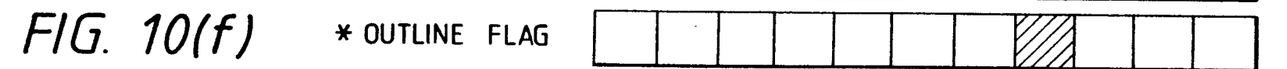
Figure 10G:
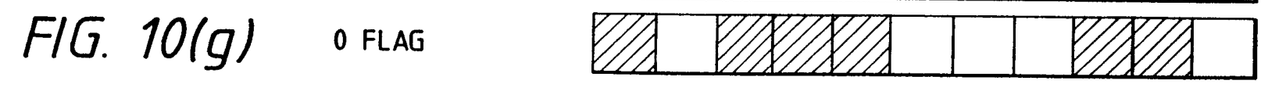

First, in the pattern filling circuit 31, the adder 31A outputs an added value as shown in FIG. 10(b) by adding a value from the count register 33 and data from the frame memory 14. In FIG. 10(b), the value in the element 200 shows the initial value (namely, the value "0"). Then, in the pattern filling circuit 31, the deciding part 31B performs the deciding operation on the value from the count register 33 while the deciding part 31C performs the deciding operation on the value from the adder 31A, and the results of such decisions are input to the AND circuit 31D. As shown in FIG. 10(c), the AND circuit 31D outputs a pattern filling flag of the value "1" only when both the deciding parts 31B and 31C have decided that the input values are in conformity with the respective decision criteria.

On the other hand, it is decided by the individual deciding parts 32A to 32D in the outline/0-flag setting circuit 32 whether or not the input data are in conformity with the respective decision criteria. In case the input data is found to be in conformity, either of the flags of negative, positive, *, and 0, is set at "1". For example, in case the value "−1" is input, the value is found to be in conformity with only the decision criterion of the deciding part 32A because this value is smaller than "0", and therefore the negative flag is set at "1".

The individual flags from the deciding parts 32A to 32D are input to the mode switching circuit 35.

Figure 11:
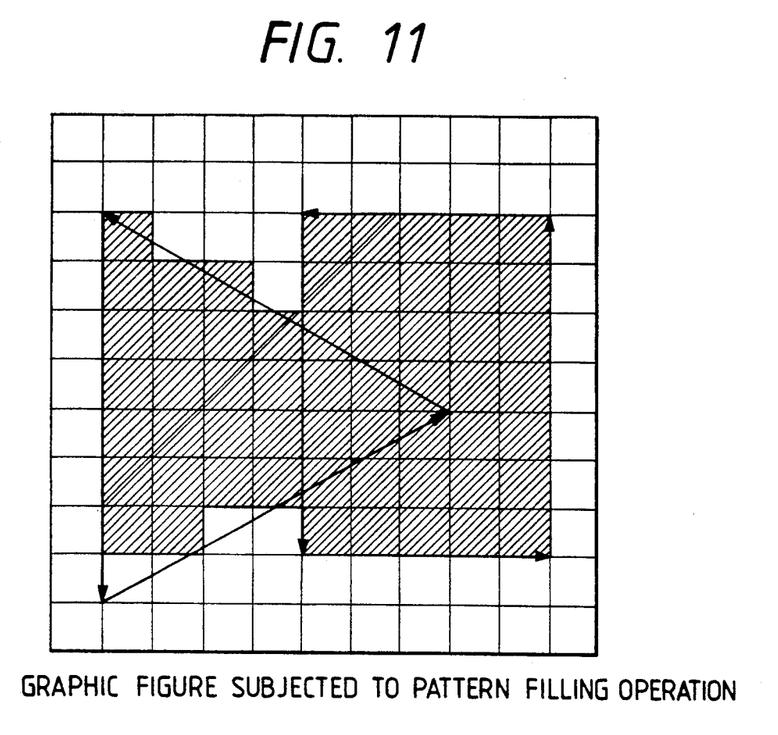
FIG. 11 illustrates a graphic FIGURE processed for filling a pattern with dots.

In case the pattern filling operation is to be performed, the pattern filling process mode I described above is set in the mode register 34. Hence, the Ex-OR circuit 35G outputs the signal "1" only when the flag "1" is input to the input terminal of the AND circuit 35A or the AND circuit 35B (Refer to FIGS. 10(c) and 10(d)). With the operation performed in this manner with respect to each of the lines along the direction X, the pattern filling operation is executed on the original FIGURES (refer to the FIGURES in vector expression), as shown in FIG. 11. Each of the elements in FIG. 11 corresponds to one dot.

Figure 12:
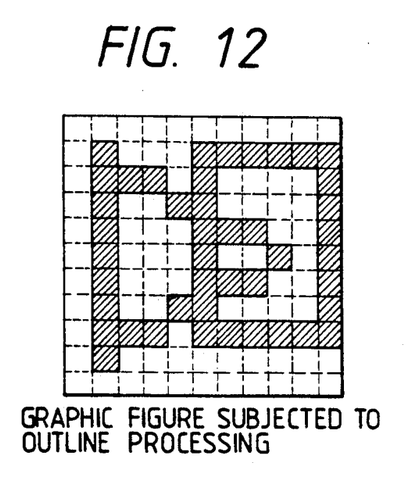
FIG. 12 illustrates a graphic FIGURE subjected to outline processing.

For the performance of the outline processing operation, the outline processing mode II mentioned above is set in the mode register 34. Therefore, the Ex-OR circuit 35G outputs the signal at "1" only when the flag "1" is input to the input terminal of the AND circuit 35B, 35C or 35D (refer to FIGS. 10(d), 10(e) and 10(f)). With the operation performed in this manner with respect to each of the lines along the direction X, the outline processing operation is executed on the original FIGURES (refer to the FIGURES in vector expression), as shown in FIG. 12. In FIG. 12, each element corresponds to one dot.

Figure 13:
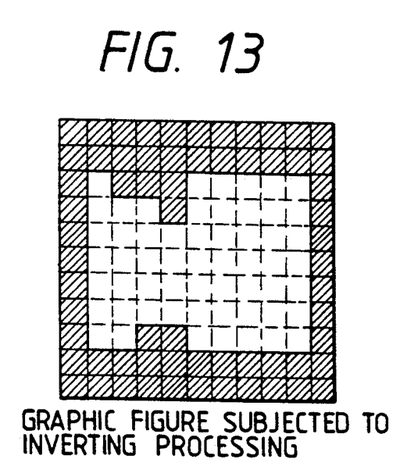
FIG. 13 illustrates a graphic FIGURE subjected to inverting processing.

When the inverting operation is to be performed, the inverting process mode III described above is set in the mode register 34. Therefore, the Ex-OR circuit 35G outputs the signal at "1" only when the flag "0" is input to the input terminals of the AND circuits 35A and 35B (refer to FIGS. 10(c) and 10(d)). With this operation thus performed with respect to each of the lines along the direction X, the inverting operation is executed on the original FIGURES (refer to the FIGURES in vector expression), as shown in FIG. 13. Each element in the FIG. 13 corresponds to one dot.

The results of the individual processing operations described above can be put on a bit map display or can be printed out with a printer.

As described in the foregoing, the outline data image drawing apparatus in this embodiment is capable of drawing into the frame memory the image drawing data in correspondence with outlines of a desired pattern (in this embodiment, the overlapped pattern of a triangle and a rectangle). Hence, in the case where the image drawing mode is set to the pattern filling mode, the apparatus according to the above embodiment is capable of executing an accurate pattern filling operation in correspondence with a desired pattern by outputting an appropriate dot pattern on the basis of the contents stored in the frame memory 14.

Now that the image drawing data corresponding to the outlines of graphic FIGURES and the like are drawn into the frame memory 14, the apparatus according to the present invention is capable of producing outline characters (contour characters) by taking out part of the image drawing data which are not "0" instead of filling up the pattern with dots, and also capable of producing inverted characters by taking out part of the image drawing data which are "0".

As described above, the present invention provides an apparatus which draws the image drawing data with the image drawing direction information on outline vectors into the memory means, so that the image drawing data corresponding to outlines in a desired pattern are drawn in the memory means even in such a case that outlines of graphic FIGURES or the like are overlapped with each other. Thus, the apparatus is capable of performing an accurate pattern filling operation corresponding to a desired pattern without drop out of the dot pattern information of the area where the patterns overlap with each other, as is the case with the conventional apparatus, and also capable of extracting outlines corresponding to a desired pattern.

Therefore, the apparatus according to the present invention can obtain a desired dot pattern with high fidelity to the original graphic FIGURES.

What is claimed is:

1. An outline data image drawing apparatus comprising:

scan conversion means for converting vector information representing an outline of a pattern such as a graphic FIGURE into segment direction information representing image drawing direction information for a multiplicity of vector segments;

memory means for storing image drawing data as a bit map on a dot-by-dot basis;

memory means for storing image drawing data as a bit map on a dot-by-dot basis;

image drawing data generation means for generating raster information having image drawing direction information from the segment direction information of the scan conversion means in accordance with predetermined image drawing direction rules, and for generating new image drawing data from the raster information and from previous image drawing data, stored in the memory means and having a bit-mapped correspondence to the new image drawing data, in accordance with predetermined image drawing rules, and for transmitting as output the new image drawing data to the memory means; and dot pattern conversion means for converting the image drawing data provided from the memory means into a dot pattern signal in accordance with an image drawing mode as set in the dot pattern conversion means, wherein the image drawing mode includes an inverting processing mode.

* * * * *

UNITED STATES PATENT AND TRADEMARK OFFICE
CERTIFICATE OF CORRECTION

PATENT NO. : 5,274,752
DATED : December 28, 1993
INVENTOR(S) : Ichiro Kawazome

It is certified that error appears in the above-indentified patent and that said Letters Patent is hereby corrected as shown below:

On the title page, item [56]:
Attorney, Agent or Firm, front page, line 2,
delete "Farabow" (second occurrence).

Claim 1, column 10, delete lines 57-58.

Signed and Sealed this

Twenty-seventh Day of September, 1994

Attest:

BRUCE LEHMAN

Attesting Officer

Commissioner of Patents and Trademarks